(12) United States Patent
Bessy

(10) Patent No.: US 10,385,924 B2
(45) Date of Patent: Aug. 20, 2019

(54) DEVICE FOR COOLING A ROLLING BEARING FOR A TURBINE ENGINE

(71) Applicant: Safran Aircraft Engines, Paris (FR)

(72) Inventor: Arnaud Bessy, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/573,813

(22) PCT Filed: May 27, 2016

(86) PCT No.: PCT/FR2016/051273
§ 371 (c)(1),
(2) Date: Nov. 13, 2017

(87) PCT Pub. No.: WO2016/193596
PCT Pub. Date: Dec. 8, 2016

(65) Prior Publication Data
US 2018/0258792 A1 Sep. 13, 2018

(30) Foreign Application Priority Data

May 29, 2015 (FR) ...................... 15 54839

(51) Int. Cl.
F16C 37/00 (2006.01)
F16C 33/58 (2006.01)
(Continued)

(52) U.S. Cl.
CPC .......... F16C 37/007 (2013.01); F01D 25/125 (2013.01); F01D 25/16 (2013.01);
(Continued)

(58) Field of Classification Search
CPC .... F16C 33/586; F16C 37/007; F01D 25/125; F01D 25/162; F01D 25/20; F05D 2260/98
(Continued)

(56) References Cited

U.S. PATENT DOCUMENTS 3,480,342 A 11/1969 Venable
6,158,895 A * 12/2000 Date ..................... F16C 37/007
384/493
9,068,593 B2 * 6/2015 Gloeckner ............ F16C 37/007

FOREIGN PATENT DOCUMENTS

CN 204300141 4/2015
DE 3926493 2/1991
(Continued)

OTHER PUBLICATIONS

Snecma, "International Search Report," PCT Application No. PCT/FR2016/051273 (dated Sep. 16, 2017).

Primary Examiner — James Pilkington
(74) Attorney, Agent, or Firm — Womble Bond Dickinson (US) LLP

(57) ABSTRACT

A device for cooling a rolling bearing (112), in particular for a turbine engine. The device includes an annular bearing support (124) having a substantially cylindrical wall (134) of which an inner peripheral face (136) is configured to surround an outer ring (122) of the rolling bearing. The wall is able to dispense cooling fluid via a fluidic network for circulating the fluid and for supplying annular cooling grooves (144) of the bearing with fluid.

9 Claims, 2 Drawing Sheets

(51) Int. Cl.
  *F01D 25/12* (2006.01)
  *F01D 25/16* (2006.01)
  *F01D 25/18* (2006.01)
  F16C 35/04 (2006.01)
  F16C 19/06 (2006.01)

(52) U.S. Cl.
  CPC ........... *F01D 25/162* (2013.01); *F01D 25/18* (2013.01); *F16C 33/586* (2013.01); F05D 2240/55 (2013.01); F16C 19/06 (2013.01); F16C 35/045 (2013.01); F16C 2360/23 (2013.01); Y02T 50/675 (2013.01)

(58) Field of Classification Search
  USPC ........................................................ 384/476
  See application file for complete search history.

(56) References Cited

FOREIGN PATENT DOCUMENTS

| | | |
|---|---|---|
| EP | 0574103 | 12/1993 |
| FR | 2239150 | 2/1975 |
| GB | 985804 | 3/1965 |
| GB | 2187239 | 9/1987 |
| GB | 2327470 | 1/1999 |
| JP | S616025 | 1/1986 |

\* cited by examiner

DEVICE FOR COOLING A ROLLING BEARING FOR A TURBINE ENGINE

TECHNICAL FIELD

The present invention relates in particular to a device for cooling a roller bearing, in particular for a turbine engine, for example of an aircraft.

PRIOR ART

The prior art includes in particular GB-1-2 187 239, GB-A-2 327 470, FR-A5-2 239 150, DE-A1-39 26 493, GB-A-985 804, EP-A1-0 574 103, JP-U-S61 6025, U.S. Pat. No. 3,480,342 and CN-U-204 300 141.

Conventionally, a turbine engine roller bearing is mounted between an inner part and an outer part, the bearing comprising rolling elements mounted between an outer race that is rigidly connected to the outer part and an inner race that is rigidly connected to the inner part. The rolling elements can be received in housings of an annular cage that is interposed between the races and that makes it possible in particular to keep the rolling elements at a distance from one another.

FIG. 1 shows an enclosure 10 for lubricating a roller bearing 12, in this case a ball bearing 14, of an aircraft turbine engine, said turbine engine being a turbojet engine or a turboprop engine, for example.

A turbine engine conventionally includes, from upstream to downstream, in the direction of flow of the gases in the engine, at least one compressor, an annular combustion chamber, and at least one turbine. The rotor of the compressor is connected to the rotor of the turbine. If the turbojet engine is a twin-spool turbojet engine, the spools being high-pressure and low-pressure, respectively, the high-pressure (HP) spool includes a HP shaft which connects the rotor of the HP compressor to the rotor of the HP turbine, and the low-pressure (LP) spool includes an LP shaft which connects the rotor of the LP compressor to the rotor of the LP turbine.

If the bearing is mounted between a stator part, which is generally an outer part, and a rotor part, which is generally an inner part, one of the races (generally an outer part) is rigidly connected to an annular bearing support.

A turbine engine bearing is generally lubricated by means of at least one nozzle which sprays oil onto the bearing or in the vicinity of the bearing. The bearing and the oil nozzle(s) are usually located in a lubrication enclosure in which an oil mist prevails, said enclosure being part of a module (i.e. of a sub-assembly) of the turbine engine.

The shafts of the turbine engine are centered and guided in rotation by means of roller bearings which are housed in enclosures such as that shown in FIG. 1.

If the roller bearing 12 is mounted between a stator part and a rotor part, the enclosure 10 is delimited by stator walls and rotor walls. In the example shown, the enclosure 10 includes outer stator walls 16 (shown in part) and inner rotor walls 18 (shown in part), which are usually shaft portions of the turbine engine.

The bearing 12 includes two races, inner 20 and outer 22, respectively, between which rolling elements, in this case ball bearings 14, are mounted. The ball bearings 14 are received in housings of an annular cage 23 that is arranged between the races 20, 22.

The outer race 22 is attached to the inner periphery of a first annular bearing support 24, the outer periphery of which is attached to the stator walls 16.

The inner race 20 is attached to the outer periphery of a second annular bearing support 26, the inner periphery of which is attached to a rotor wall 18 or shaft portion.

An oil mist prevails in the enclosure 10. The oil is injected into the enclosure 10 by means of nozzles 28 that are connected to an oil reservoir and to a pump by means of a pipe 30.

However, in the prior art, the nozzle(s) is/are located on one side of the bearing and spray oil on this side of the bearing. The nozzles are supplied with oil by means of a pipe. The nozzles are not rigidly connected to the bearing support. The pipe is attached to the nozzles during the assembly operations of the module and this action is carried out blind. Lubrication by means of nozzles is not precise. It can vary depending on the oil flow and pressure and is greatly affected by the positioning of the nozzles.

As can be seen in FIG. 1, the nozzles 28 are arranged on one side of the bearing 12 and are oriented so as to spray oil on one side of the bearing. This technology has the drawbacks described above.

Moreover, spraying oil on the bearing is not always enough to ensure the cooling thereof.

The present invention offers a simple, effective and economical solution to the latter problem in particular.

DISCLOSURE OF THE INVENTION

The invention proposes a device for cooling a roller bearing, in particular for a turbine engine, the device comprising an annular bearing support comprising a substantially cylindrical wall, an inner peripheral surface of which is designed to surround an outer race of said roller bearing, said wall is provided with means for distributing cooling fluid, which means include a fluidic network for circulating said fluid, said fluidic network comprising a first fluid inlet designed to be connected to cooling fluid supply means, a first fluid outlet designed to be connected to means for discharging said fluid, a second fluid outlet connected to said first fluid inlet and in fluid communication with a first oil feed-though duct in said wall in order to supply cooling oil to said bearing, and a second fluid inlet connected to said first fluid outlet and in fluid communication with a second oil feed-through duct in said wall in order to recover oil after cooling the bearing, the distribution means being formed by a distributor block that is connected and attached to an outer peripheral surface of said wall.

It is thus understood that the cooling fluid, which is preferably oil and in particular oil for lubricating the bearing, enters the network of distribution means via the first inlet, then leaves therefrom via the second outlet in order to cool the bearing. After the bearing has been cooled, the oil again enters the network of distribution means via the second inlet to then leave again therefrom via the first outlet in order to be discharged.

The device according to the invention can include one or more of the following features, taken independently or in combination:

said wall directly surrounds said outer race of the bearing, the oil feed-through ducts in said wall each have an orientation that is substantially radial relative to a rotational axis of said wall, the oil feed-through ducts open onto said inner peripheral surface of said wall, and the fluidic network includes a third fluid inlet in fluid communication with a third oil feed-through duct in said wall in order to recover oil after the bearing has been cooled, and a third fluid outlet connected to said third fluid inlet and in fluid communication with a fourth oil feed-through duct in said wall in order to supply cooling oil to said bearing.

According to these latter features, it can be seen that after the bearing has been cooled for a first time, the oil enters the network of distribution means via the third inlet to then leave again therefrom via the third outlet in order be used again to cool the bearing. The circulation of oil from the third inlet to the third outlet preferably occurs after the circulation of oil from the first inlet to the second outlet, and before the circulation of oil from the second inlet to the first outlet.

The present invention also relates to an assembly comprising a device of this kind and a roller bearing, the roller bearing comprising an outer race that is surrounded by said wall of the bearing support and that comprises an outer cylindrical surface that radially abuts said inner peripheral surface of said wall, said feed-through ducts in said wall opening into at least one annular groove defined between said abutment surfaces in order to circulate cooling fluid in said at least one groove.

Advantageously, the distribution means include at least one finger, a free end of which is inserted into a region of said at least one groove and sealingly engages with walls of said groove in order to block the circulation of fluid through said region.

The present invention also relates to a turbine engine, in particular of an aircraft, comprising at least one device or an assembly as described above.

DESCRIPTION OF THE FIGURES

The invention will be better understood and other details, features and advantages of the invention will become apparent upon reading the following description given by way of non-limiting example and with reference to the accompanying drawings, in which.

DETAILED DESCRIPTION

Figure 1:
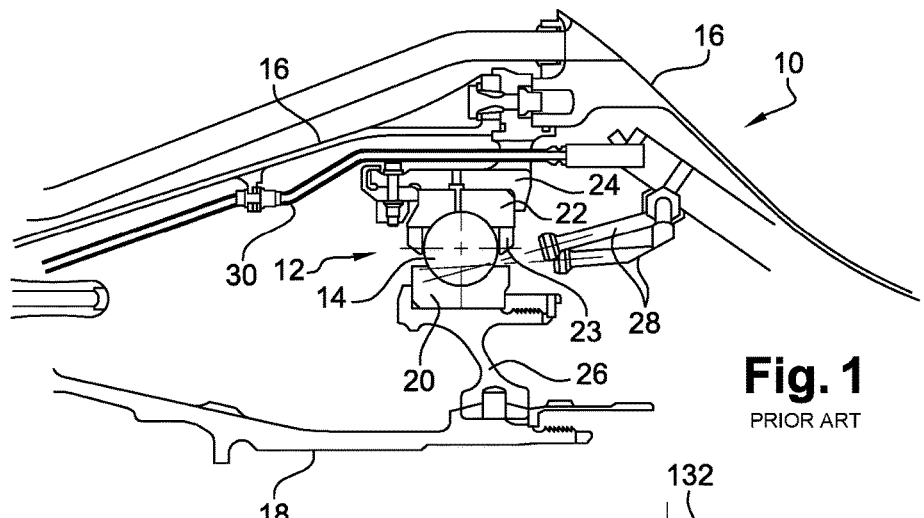
FIG. 1 is a partial schematic half-view in axial section of a lubrication enclosure of a roller bearing for an aircraft turbine engine according to the prior art.

FIGS. 2 to 6 show an embodiment of a cooling device according to the invention.

The device according to the invention essentially includes two elements, namely an annular bearing support 124 and means 132 for distributing cooling fluid.

The bearing support 124 comprises a substantially cylindrical wall 134 comprising an inner peripheral surface 136 and an outer peripheral surface 138.

The wall 134 is connected by its downstream end to a radially outer annular flange 140 for attaching the bearing support to the aforementioned stator walls. This attachment can be carried out using means of the screw and nut type. The wall 134 and the flange 140 are connected in this case by an annular row of stanchions 142 that are substantially radial relative to the rotational axis A of the support 124.

The inner peripheral surface 136 is cylindrical in this case and is intended to engage on and to abut an outer cylindrical surface of the outer race 122 of the roller bearing 112 (ball bearing 114 in the example shown).

Figure 5:
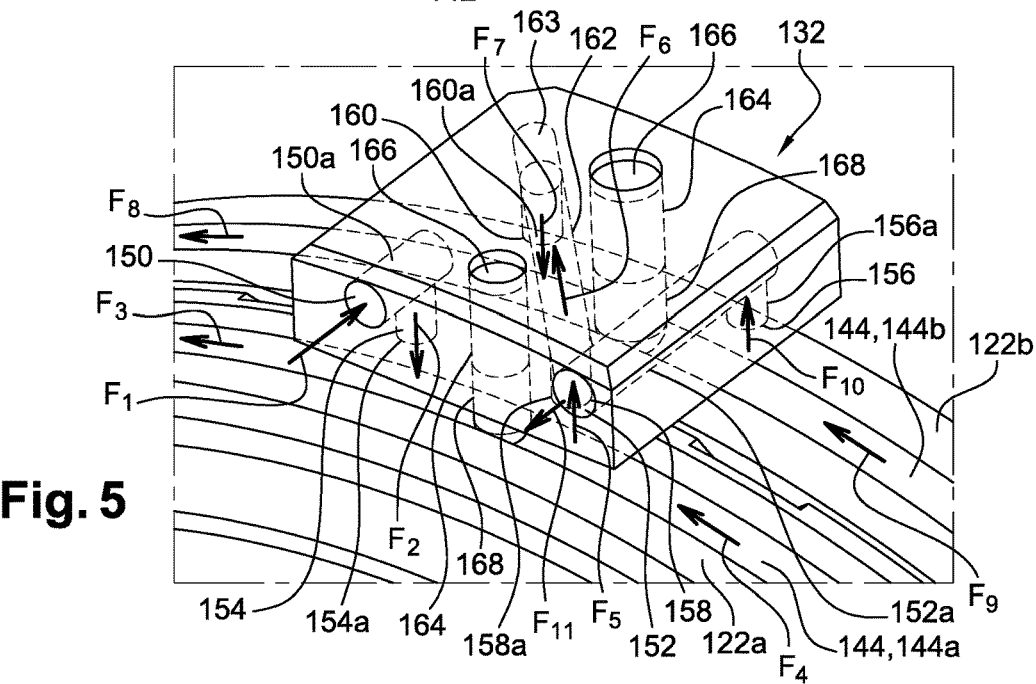

The outer race 122 is in this case formed by two annular half-races 122a, 122b which are axially contiguous. Each half-race 122a, 122b includes, in its inner periphery, an annular cavity defining a portion of the raceway of the ball bearing 114 of the inner race 122, and, in its outer periphery, an annular groove 144 which extends around the axis A (FIG. 5).

The groove 144a, 144b in each half-race 122a, 122b is sealingly closed at its outer periphery by the inner surface 136 of the wall 134.

Figure 2:
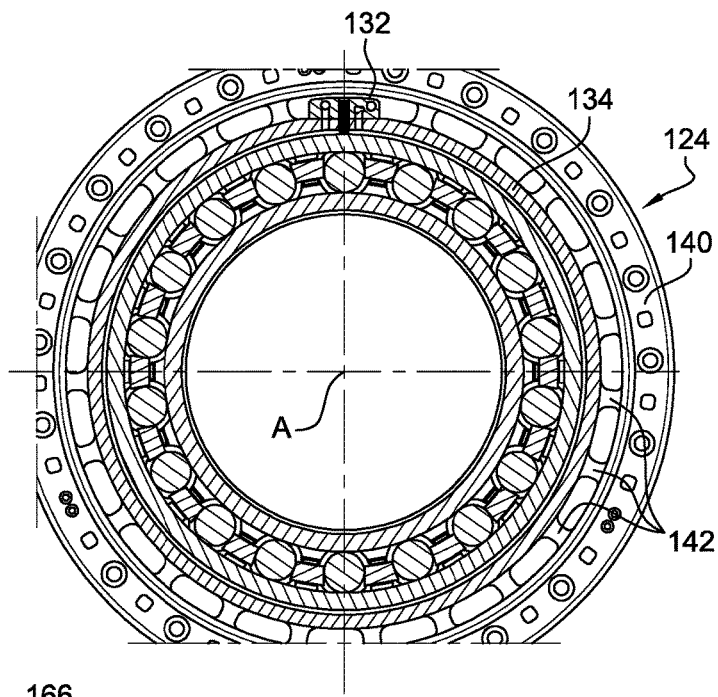
FIG. 2 is a partial schematic front view of an assembly comprising a roller bearing and a cooling device according to the invention.
Figure 3:
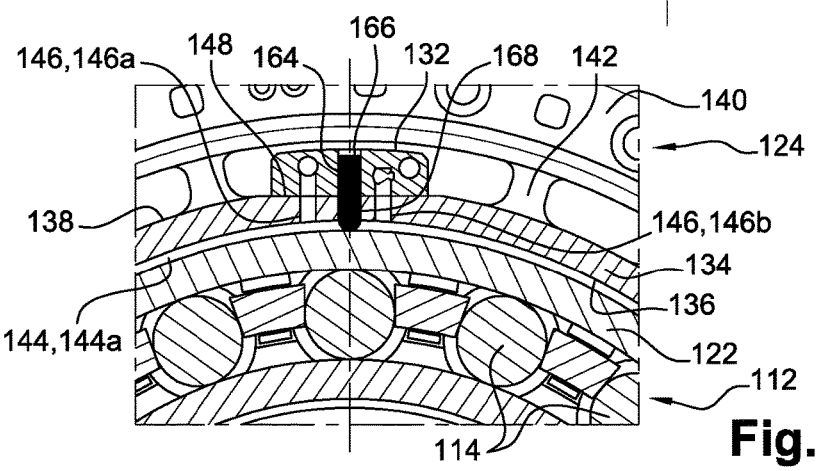
FIG. 3 is a larger-scale view of a part of FIG. 2.
Figure 4:
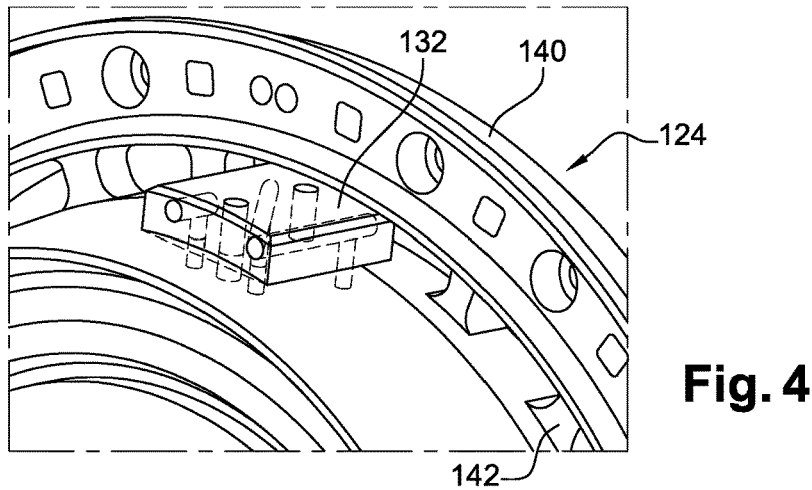
FIGS. 4 and 5 are schematic perspective views of cooling fluid distribution means of the device according to the invention.

The wall 134 of the support 124 includes oil feed-through ducts 146. Said ducts 146 in this case have an orientation that is substantially radial relative to the axis A. The radially inner end of each duct 146 opens onto the surface 136 to the right of one of the grooves 144 in order to be in fluid communication therewith (FIGS. 2 and 3).

In the example shown, the wall 134 includes two ducts 146a, 146b in fluid communication with the groove 144a in the half-race 122a, and two ducts 146a, 146b in fluid communication with the groove 144b in the half-race 122b. The groove 144a and the ducts 146a, 146b connected to said groove extend substantially in the same transverse plane, which is at a distance from the transverse plane in which the groove 144b and its ducts 146a, 146b extend. With respect to FIGS. 2 and 3, one of these transverse planes corresponds to the plane of the sheet.

The radially outer ends of the ducts 146 open onto the outer peripheral surface 138 of the wall 134, and more precisely onto an outer planar surface 148 of the wall, to which the aforementioned distribution means 132 are intended to be connected and attached. As will be described in the following, the ducts 146a are used to supply cooling oil to the grooves 144a, 144b, and the ducts 146b are used to discharge oil after circulation in the grooves 144a, 144b.

In the example shown, the distribution means 132 are integral and include a distributor block comprising in particular an inner fluidic network for circulating cooling oil.

The wall 134 of the support 124 is intended to be provided with said distributor block, which can be attached to said wall by any means, for example by brazing or welding where the materials of the support 124 and the distributor block allow this. Said materials are metal, for example.

The distributor block has a generally parallelepipedal shape and includes a lower surface, or a surface that is radially inner relative to the axis A and is placed against the surface 148 of the wall 134.

In the example shown, the fluidic network of the distributor block includes:
 a first oil inlet 150 designed to be connected to means for distributing cooling fluid (not shown),
 a first oil outlet 152 designed to be connected to means for discharging cooling fluid (not shown),
 a second oil outlet 154 connected to the first inlet 150 and in fluid communication with the duct 146a connected to the groove 144a of the half-race 122a,
 a second oil inlet 156 connected to the first outlet 152 and in fluid communication with the duct 146b connected to the groove 144b in the half-race 122b,
 a third oil inlet 158 in fluid communication with the duct 146b connected to the groove 144a in the half-race 122a, and lastly a third oil outlet 160 connected to the third inlet 158 and in fluid communication with the duct 146a connected to the groove 144b in the half-race 122b.

The first inlet 150 and the first outlet 152 are in this case located on the same lateral surface of the distributor block, which surface extends substantially transversely to the axis A and which is in this case oriented in the upstream direction. The other inlets 156, 158 and outlets 154, 160 are all located on the aforementioned lower surface of the block, which surface is placed against the surface 148 of the wall 134. Said inlets 156, 158 and outlets 154, 160 are therefore all oriented radially inwards.

Figure 6:
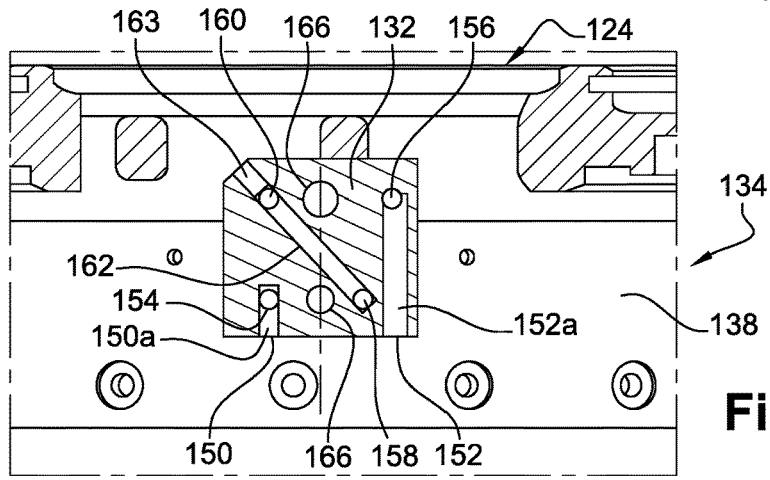
FIG. 6 is a schematic view from above of the distribution means from FIGS. 4 and 5.

The various inlets and outlets of the distributor block are formed by inner channels. The first inlet 150 and the first outlet 152 are formed by the parallel channel openings that extend substantially in parallel with the axis A (FIG. 6). The channel 150a forming the first inlet 150 is shorter than the channel 152a forming the first outlet 152. The end of the channel 150a opposite the inlet 150 is connected to an end of a channel 154a of which the other end forms the outlet 154. The end of the channel 152a opposite the outlet 152 is connected to an end of a channel 156a of which the other end forms the inlet 156. The channels 154a, 156a are substantially parallel. The inlet 158 and the outlet 160 are formed by the parallel channel openings. The end of the channel 158a forming the inlet 158 and opposite said inlet is connected to an end of a channel 162 of which the other end is connected to the end of the channel 160a forming the outlet 160 and opposite said outlet. As can be seen in FIG. 6, the channel 162 has an orientation that is substantially oblique relative to the channels 150a, 152a.

The channels of the distributor block preferably all open onto surfaces of the block. This makes it possible to facilitate the production of the block, the channels being for example produced by boring into the block. As can be seen in particular in FIGS. 5 and 6, the oblique channel 162 has its opening end closed off by a sealing cap 163. The inlet 150 and the outlet 152 of the distributor block are also intended to be sealingly connected to the aforementioned means. The inlet 150 can, for example, receive an end of a pipe similar to that 30 in FIG. 1 in a sealing manner. In the same manner, the outlet 152 can, for example, receive an end of another pipe in a sealing manner. Lastly, the engagement between the lower surface of the distributor block and the surface 148 of the wall 134 makes it possible to ensure a sealed connection between the fluidic network of the block and the ducts 146a, 146b in the wall. Annular seals may optionally be interposed between said surfaces.

The distributor block further includes two substantially radial transverse bores 164 for receiving substantially cylindrical fingers 166. Said fingers 166 are elongate and have a length that is greater than the thickness or than the radial dimension of the block. As can be seen in FIGS. 2 and 3, the bores 164 in the block are aligned with the transverse bores 168 in the wall 134. The bores 164, 168 extend in the aforementioned transverse planes passing through the grooves 144 in the race 122. Each bore 164 is thus connected to a bore 168 which opens into a groove 144.

The fingers 166 are inserted from the outside into the bores 166, 168 until the radially inner ends thereof are inserted into the grooves 144a, 144, respectively, and radially abut the bottoms of the grooves. The radially inner ends of the fingers are hemispherical and have, in axial section, a shape that matches the cross section of the groove. Therefore, the ends of the fingers 166 can abut the walls of the grooves 144 and sealingly engage therewith in order to form obstructions in the grooves that cannot be passed by the oil.

A first of the fingers 166 is located between the outlet 154 and the inlet 152, and the second finger 166 is located between the outlet 160 and the inlet 156. It is thus understood that the oil that leaves the distributor via the outlet 154 enters the groove 144a and cannot directly flow as far as the inlet 152 owing to the finger 166 that impedes the passage of said oil. The oil must therefore flow along the entire circumference of the race 122, into the groove 144a, until it reaches the inlet 152. In the same manner, the oil that leaves the distributor via the outlet 160 enters the groove 144b and cannot directly flow as far as the inlet 156 owing to the finger 166 that impedes the passage of said oil. The oil must therefore flow along the entire circumference of the race 122, into the groove 144b, until it reaches the inlet 156.

In conclusion, as is shown schematically by the arrows F1 to F11 in FIG. 5, oil is conveyed by a pipe as far as the inlet 150 and then flows through the channels 150a, 154a as far as the outlet 154 in order to supply oil to the groove 144a in the half-race 122a. This oil flows around the bearing race in order to cool it then reaches the inlet 152. The oil then flows into the channels 152a, 162, 160a to reach the outlet 160 in order to supply oil to the groove 144b in the half-race 122b. This oil flows around the bearing race in order to cool it then reaches the inlet 156. The oil then flows into the channels 156a, 152a in order to reach the outlet 152 and be discharged via the other pipe.

The device according to the invention can be assembled in the following manner. The distributor block is attached to the wall 134 of the bearing support 124, as explained above. The bearing support 124 is then mounted on the bearing 112, and in particular on its outer race 122. The fingers 166 are then inserted into the bores 164, 168 until the radially inner ends thereof radially abut the bottoms of the grooves 144 in the race 122. The assembly of FIG. 2 is then obtained, which assembly can be attached by means of the flange 140 to a stator wall such as that 16 shown on the right in FIG. 1. The aforementioned pipes for supplying oil and discharging oil can be rigidly connected to the other stator wall 16 (shown on the left in FIG. 1). This stator wall is moved in translation from upstream along the axis A until the pipes sealingly engage with the inlet 150 and the outlet 152 of the distributor block. The stator walls 16 are thus attached together and to the flange 140 using means of the screw and nut type.

The invention claimed is:

1. A device for cooling a roller bearing, the device comprising an annular bearing support comprising a substantially cylindrical wall, an inner peripheral surface of which is designed to surround an outer race of said roller bearing,
wherein said cylindrical wall includes:
a first oil feed-though duct to supply cooling oil to said bearing,
a second oil feed-through duct to recover oil after cooling the bearing,
a cooling fluid distributor, which includes a fluidic network for circulating said fluid, said fluidic network comprising:
a first fluid inlet designed to be connected to cooling fluid supply means,
a first fluid outlet designed to be connected to means for discharging said fluid,
a second fluid outlet connected to said first fluid inlet and in fluid communication with said first oil feed-though duct, and
a second fluid inlet connected to said first fluid outlet and in fluid communication with said second oil feed-through duct, the cooling fluid distributor being formed by a distributor block that is connected and attached to an outer peripheral surface of said cylindrical wall.

2. The device according to claim 1, wherein said cylindrical wall directly surrounds said outer race of the bearing.

3. The device according to claim 1, wherein the oil feed-through ducts each have an orientation that is substantially radial relative to a central axis of said substantially cylindrical wall.

4. The device according to claim 1, wherein the oil feed-through ducts open onto said inner peripheral surface of said cylindrical wall.

5. The device according to claim 1, wherein the fluidic network includes a third fluid inlet in fluid communication with a third oil feed-through in said cylindrical wall in order to recover oil after the bearing has been cooled, and a third fluid outlet connected to said third fluid inlet and in fluid communication with a fourth oil feed-through duct in said cylindrical wall in order to supply cooling oil to said bearing.

6. An assembly comprising a device according to claim 1 and a roller bearing, the roller bearing comprising an outer race that is surrounded by said cylindrical wall of the bearing support and that comprises an outer cylindrical surface that radially abuts said inner peripheral surface of said cylindrical wall, said feed-through ducts in said cylindrical wall opening into at least one annular groove defined between said abutment surfaces in order to circulate cooling fluid in said at least one groove.

7. The assembly according to claim 6, wherein the cooling fluid distributor include at least one finger, a free end of which is inserted into a region of said at least one groove and sealingly engages with walls of said groove in order to block the circulation of fluid through said region.

8. A turbine engine, comprising at least one device for cooling a roller bearing, the device comprising an annular bearing support comprising a substantially cylindrical wall, an inner peripheral surface for surrounding an outer race of said roller bearing, wherein said cylindrical wall includes:
a first oil feed-though duct in said cylindrical wall in order to supply cooling oil to said bearing,
a second oil feed-through duct in said cylindrical wall in order to recover oil after cooling the bearing,
a cooling fluid distributor, which includes a fluidic network for circulating said fluid, said fluidic network comprising:
a first fluid inlet designed to be connected to cooling fluid supply means,
a first fluid outlet designed to be connected to means for discharging said fluid,
a second fluid outlet connected to said first fluid inlet and in fluid communication with said first oil feed-though duct, and
a second fluid inlet connected to said first fluid outlet and in fluid communication with said second oil feed-through duct,
the cooling fluid distributor being formed by a distributor block that is connected and attached to an outer peripheral surface of said cylindrical wall.

9. The turbine engine defined by claim 8, further comprising an assembly including a roller bearing comprising an outer race, that is surrounded by said cylindrical wall of the bearing support and that comprises an outer cylindrical surface that radially abuts said inner peripheral surface of said cylindrical wall, said feed-through ducts in said cylindrical wall opening into at least one annular groove defined between said abutment surfaces in order to circulate cooling fluid in said at least one groove.

* * * * *